United States Patent [19]
Monzen et al.

[11] Patent Number: 5,505,858
[45] Date of Patent: Apr. 9, 1996

[54] POLYOLEFIN FILTER ELEMENT AND METHOD FOR THE PRODUCTION THEREOF

[75] Inventors: Takashi Monzen; Masaharu Watanabe, both of Kitakoma, Japan

[73] Assignee: Kitz Corporation, Japan

[21] Appl. No.: 220,195

[22] Filed: Mar. 30, 1994

[30] Foreign Application Priority Data

Dec. 17, 1993 [JP] Japan .................................. 5-343355

[51] Int. Cl.$^6$ .......................... B01D 63/02; B01D 71/26
[52] U.S. Cl. .................. 210/500.23; 96/10; 210/450; 210/500.36; 264/41
[58] Field of Search ................. 210/500.23, 500.36, 210/321.8, 321.89, 450; 55/528; 96/8, 10; 264/41

[56] References Cited

U.S. PATENT DOCUMENTS 5,158,680  10/1992  Kawai et al. ....................... 210/450
5,354,470  10/1994  Seita et al. ........................ 210/500.23

FOREIGN PATENT DOCUMENTS 1-218605   8/1989   Japan .
3-245826  11/1991   Japan .
4-63117    2/1992   Japan .

*Primary Examiner*—Joseph W. Drodge
*Attorney, Agent, or Firm*—Wenderoth, Lind & Ponack

[57] ABSTRACT

A filter element includes a bundle of hollow fibers made of first polyolefin. The bundle has at least one end sealed with second polyolefin having an average molecular weight in the range of 1,000 to 16,000. The filter element is produced by a method including the steps of fusing the second polyolefin having a fusion point lower than that of the first polyolefin, attaching the fused second polyolefin to at least one end of the bundle, allowing the attached second polyolefin to set, thereby providing the bundle with a sealed portion, and cutting off the leading end of the sealed portion.

6 Claims, 2 Drawing Sheets

POLYOLEFIN FILTER ELEMENT AND METHOD FOR THE PRODUCTION THEREOF

BACKGROUND OF THE INVENTION

1. Field of the Invention

The present invention relates to a filter element highly resistant to solvents and comprising a bundle of hollow fibers which has at least one end sealed with a thermoplastic resin material, and relates also to a method for the production thereof.

2. Description of the Prior Art

In conventional filter elements of this kind, at least one end of a bundle of hollow fibers is sealed with urethane adhesive. Use of such urethane adhesive leads to good workability when providing the at least one end of the bundle with a sealed portion. A filter module having such a conventional filter element contained in a housing exhibits sufficient durability to water. However, it is inferior in durability to an aqueous alcohol solution or organic solvents such as alcohol.

In view of the above, filter elements each comprising a bundle of hollow fibers which has at least one end sealed with a thermoplastic resin material resistant to solvents have recently been developed. Such filter elements are disclosed, for example, in Japanese Patent Non-examined Publications No. 1-218605, No. 8-245826 and No. 4-63117.

However, use of such thermoplastic resin has disadvantages in (1) that the step of forming a sealed portion requires a treating temperature higher than in the case of using urethane adhesive in order to obtain fluidity of the resin, resulting in thermal deformation of the hollow fibers and possible destruction of the inside diameters of the hollow fibers depending on a combination with the material of which the hollow fibers are made, (2) that since thermoplastic resin has viscosity higher than that of urethane adhesive, it fails to propagate over the entire spaces between the adjacent hollow fibers even if it should gain fluidity, resulting in an incomplete sealed portion, and (3) that thermoplastic resin encounters volume shrinkage larger than that of urethane adhesive during its setting, resulting in an incomplete sealed portion having crazing and/or cavities.

The first cited Japanese Publication discloses a method for the formation of a sealed portion of a bundle of hollow fibers by filling the inside of the ends of the hollow fibers with calcium carbonate so as not to induce thermal deformation, then sealing the spaces between the adjacent ends of the hollow fibers with fine particles of thermoplastic resin same as the thermoplastic resin of which the hollow fibers are made, and fusion bonding the ends of the hollow fibers. This method requires the steps of removing the calcium carbonate by dissolving it in concentrated hydrochloric acid which will constitute waste matter and disposing of the waste matter, and encounters some difficulty in fusion bonding the ends of the hollow fibers liquid-tightly over the entire area using finely particulate sealing material and failure to fusion bond the center portion of the bundle of hollow fibers. Thus, this prior art cannot eliminate the disadvantages (2) and (3) mentioned above.

The second cited Japanese Publication discloses a method for the formation of a sealed portion of a bundle of hollow fibers, which adopts the step of causing the sealed portion to set from the lower part thereof to eliminate the aforesaid disadvantage (3) and uses, as a material for hollow fibers, engineering plastic generally exhibiting high resistance to heat, including polysulfone, polyether sulfone and polyimide and, as a sealing material, thermoplastic resin including polyolefin, polyvinyl chloride, nylon and polyester. This method requires that the fusion point of the material for hollow fibers be much higher than that of the sealing material and cannot eliminate the aforesaid disadvantage (2).

The third cited Japanese Publication discloses a method for the formation of a sealed portion of a bundle of hollow fibers, which uses first polyolefin as a material for hollow fibers and, as a sealing material, second polyolefin having a fusion point lower than that of the first polyolefin and adopts the use of a suspension of the second polyolefin for sealing the ends of the hollow fibers. The products obtained in accordance with this method, however, are not stable in liquid tightness. Thus, this method produces no satisfactory results.

The present invention has been proposed for the purpose of solving the problems mentioned above.

An object of this invention is to provide a filter element highly resistant to solvents and chemicals.

Another object of this invention is to provide a method for the production of the filter element at low cost.

SUMMARY OF THE INVENTION

To attain the above objects, according to this invention there is provided a filter element comprising a bundle of hollow fibers made of first polyolefin, which bundle has at least one end sealed with second polyolefin having an average molecular weight in the range of 1,000 to 16,000 and also provided a method for the production of the filter element comprising a bundle of fibers made of first polyolefin having a fusion point, which method comprises the steps of fusing second polyolefin having an average molecular weight in the range of 1,000 to 16,000 and a fusion point lower than the fusion point of the first polyolefin, attaching the fused second polyolefin to at least one end of the bundle, allowing the attached second polyolefin to set, thereby providing the bundle with a sealed portion, and cutting off a leading end of the sealed portion.

The above and other objects, features and advantages of this invention will become more apparent from the description given in detail hereinbelow with reference to the accompanying drawings.

DETAILED DESCRIPTION OF THE PREFERRED EMBODIMENTS

The present invention will now be described with reference to the illustrated embodiments.

Figure 1:
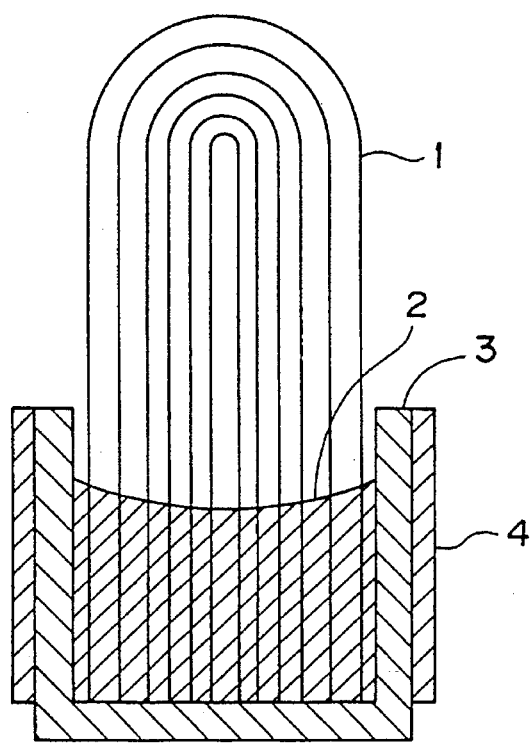
FIG. 1 is an explanatory cross section showing one embodiment of a method for producing a filter element according to this invention.
Figure 2:
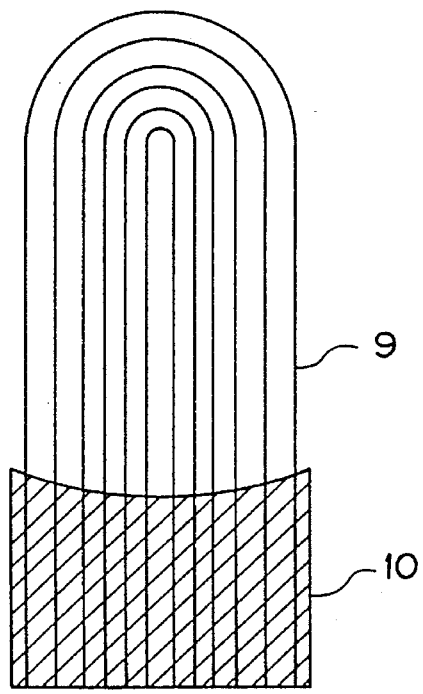
FIG. 2 is a cross section showing the filter element produced by the method.

A bundle 1 of hollow fibers made of first polyolefin is prepared. Second polyolefin having an average molecular weight in the range of 1,000 to 16,000 and a fusion point lower than that of the first polyolefin is fused in a mold 3 by heating the mold with a heating means 4. The difference between the fusion points of the first and second polyolefins falls within 30° C. The fused second polyolefine 2 in the mold 3 is left standing until it has a temperature not higher than the fusion point of the first polyolefin while maintaining its fluidity. The prepared bundle 1 is then immersed in the fused second polyolefin 2 as shown in FIG. 1. The bundle 1 is removed from the mold 3 immediately before the fused second polyolefin 2 loses its fluidity, and the second polyolefin attached to the bundle 1 is allowed to set. As a result, a filter element 9 having a sealed portion 10 of second polyolefin is obtained as shown in FIG. 2.

The second polyolefin includes low-density polyethylene having an average molecular weight of 6,000 or less, high-density polyethylene having an average molecular weight of 7,000 or less, and polypropylene having an average molecular weight of 16,000 or less. Polypropylene or high-density polyethylene is preferable when a filter element being obtained is required to be sterilized with steam. Since the second polyolefin in a fused state exhibits lower viscosity than ordinary polyolefin, it can be fused by heating the mold 3 to a temperature of 200° C. and holding the mold 3 at that temperature for several minutes, and the fused second polyolefin contains no air bubbles therein and is transparent and homogenous. Therefore, it is unnecessary to subject the fused second polyolefin to degassing under a reduced pressure. Where any problem may possibly arise when air is contained in the fused second polyolefin, the degassing step may be adopted.

When the hollow fibers of the bundle I are made of high-density polyethylene, high-density polyethylene having a low molecular weight or low-density polyethylene having a low molecular weight is preferably used as the second polyolefine. When the hollow fibers are made of polypropylene, polypropylene having a low molecular weight, high-density polyethylene having a low molecular weight or low-density polyethylene having a low molecular weight is preferably used as the second polyolefin. These combinations of the first and second polyolefins can avoid thermal deformation of the bundle 1 of hollow fibers and produce a completely sealed portion 10 having the second polyolefin propagating entirely over at least one end of the bundle 1.

As described above, the bundle 1 is removed from the mold 3 immediately before the fused second polyolefin 2 loses its fuidity, and the second polyolefin attached to the bundle 1 is allowed to set outside the mold 3. The removal of the bundle 1 from the mold 3 is carried out preferably when the temperature of the mold 3 is in the range between the fusion point of the second poloyoefin and a temperature not exceeding the temperature 10° C. higher than the fusion point of the second polyolefin. By so doing, the second polyolefin can firmly be attached to the bundle 1. In addition, since the second polyolefin attached to the bundle 1 is allowed to set outside the mold 3, there is no possibility of the sealed portion 10 suffering from crazing and/or cavities by virtue of volume shrinkage of the second polyolefin. Therefore, a filter element having at least one end sealed completely with the second polyolefin can be obtained.

Figure 3:
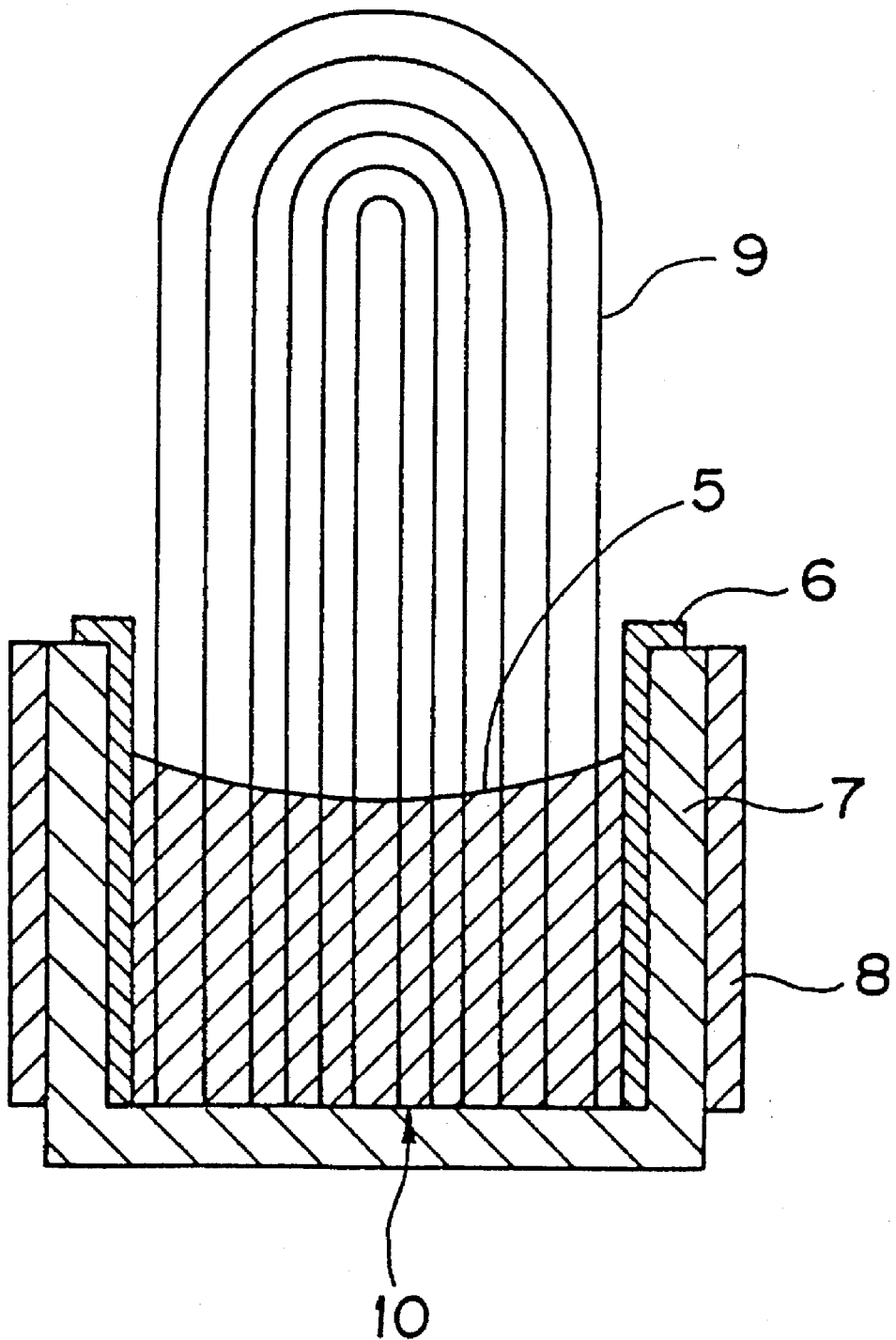
FIG. 3 is an explanatory cross section showing another embodiment of a method for producing a filter element according to this invention.

In order to obtain a filter element having a more completely sealed portion, the filter element 9 shown in FIG. 2 is inserted at its sealed portion 10 into another mold 7 having a bottomless nylon cup 6 attached to the inside thereof and a heating means 8 attached to the outside thereof as shown in FIG. 3. The mold 7 contains either fused polyolefin of a low molecular weight which may be the same as the second polyolefin or a fused mixture of the low molecular polyolefin and ordinary polyolefin having an average molecular weight larger than that of the low molecular polyolefin. The filter element 9 is removed from the mold 7 and allowed to set in the same manner as described above. The filter element 9 thus obtained is associated with a given support cylinder via an O-ring or the like into a filter module.

A given support cylinder made of ordinary polyolefin of the same type as the low molecular polyolefin may inserted into the mold 7. In this case, the filter element being obtained can be used as a filter module.

In case where the mold 7 contains a fused low molecular polyolefin and where a given support cylinder is not inserted into the mold 7, there is a possiblity that a filter element being obtained has a sealed portion liable to break when receiving a large external impact. This can be avoided by using the aforementioned fused mixture instead of the fused low molecular polyolefin.

Examples of the ordinary polyolefin include low-density polyethylene, linear low-density polyethylene, high-density polyethylene and polypropylene. The content of the ordinary polyolefin in the mixture is preferably in the range of 10 to 30% by weight.

According to the method of this invention, even when hollow fibers constituting a bundle are made of engineering plastic having a higher fusion point than polypropylene, use of the low molecular polyolefin can eliminate otherwise possible thermal deformation of the bundle and provide a completely sealed portion having the low molecular polyolefin fully propagating the spaces between the adjacent hollow fibers.

The advantages of the present invention will become more apparent from a working example and comparative experiments which will be described hereinafter.

EXAMPLE 1

A bundle 1 was prepared by bundling 3,000 hollow fibers made of polypropylene. A mold 3 containing high-density polyethylene having an average molecular weight of 3,000 was heated by a heater 4 until the fused polyolefin had no air bubbles therein. The application of heat was then stopped and the mold 3 was left standing. As soon as the temperature of the mold 3 was 160° C., the bundle 1 was inserted into the fused polyolefin and left standing. When the mold temperature became 120° C., then the bundle 1 was removed from the mold 3 to obtain a filter element 9 having a sealed portion 10 at one end thereof.

Another mold 7 having a bottomless nylon cup 6 attached fast to the inside thereof and a mixture 5 of high-density polyethylene having an average molecular weight of 3,000 and 20% by weight of straight-chain polyethylene (MFR80 as specificed under ASTM) contained inside the cup 6 was heated by a heater 8 until the fused mixture 5 had no air bubbles therein. The application of heat was then stopped and the mold 7 was left standing. As soon as the mold temperature was 130° C., the sealed portion 10 of the filter element 9 was inserted into the fused mixture 5. When the temperature of the mold 7 became 100° C., then the fitter element 9 having the cup 6 attached to the further sealed portion thereof was removed from the mold 7 and allowed to set. After the further sealed portion had set sufficiently, the attached cup 6 was removed. As a result, a filter element 9 having the end portion 10 sealed completely with polyolefin. Neither crazing nor cavities could be observed in the sealed portion 10.

The leading end of the sealed portion 10 of the filter element 9 thus obtained was cut off to form an open surface of the filter element 9. The filter element 9 was fixed to the inside of a pressure container with the sealed portion 10 sealed with an O-ring. Then, water pressure of 4 kg/cm$^2$ was applied to the filter element 9. However, no leak of water from between the hollow fibers could be found at the cut open surface of the filter element 9.

With the filter element 9 fixed inside the pressure container, 10 l of ethyl alcohol was filtered. Then, the filter element 9 was removed from the pressure container, dried in an oven heated to 60° C. and fixed again to the inside of the pressure container. Thereafter water pressure of 4 kg/cm$^2$ was applied to the filter element 9. However, no leak of water could be found at the cut open surface of the filter element 9. Although this test was repeated five times, no leak of water could be recognized at the cut open surface of the filter element 9.

Comparative Experiment 1

A bundle 1 was prepared in the same manner as in Example 1 and the same procedure as in Example 1 was taken until the insertion of the bundle 1 into the fused polyolefin. When the temperature of the mold 3 became room temperature, the bundle 1 is removed from the mold 3 to obtain a filter element 9 having a sealed portion 10 at one end thereof.

The leading end of the sealed portion 10 of the filter element 9 thus obtained was cut off to form an open surface of the filter element 9. As a result, crazing was recognized in the cut open surface.

The filter element 9 was fixed in the same manner as in Example 1 and subjected to water pressure of 4 kg/cm$^2$. As a result, leak of water from between the hollow fibers was found at the cut open surface of the filter element 9.

Comparative Experiment 2

A bundle 1 was prepared in the same manner as in Example 1 and a filter element 9 having a sealed portion 10 was obtained in the same manner as in Example 1 except that urethane adhesive was used as the sealing material.

The leading end of the sealed portion 10 of the filter element 9 thus obtained was cut off to form an open surface of the filter element 9. As a result, crazing was recognized in the cut open surface.

The filter element 9 was fixed in the same manner as in Example 1 and subjected to water pressure of 4 kg/cm$^2$. As a result, no leak of water from between the hollow fibers could be found at the cut open surface of the filter element 9.

The same test as in Example 1 effecting filtration of ethyl alcohol and application of water pressure of 4 kg/cm$^2$ was repeated. As a result, after the second and subsequent tests leak of water from between the hollow fibers was recognized at the cut open surface of the filter element 9.

As is clear from Example 1 and Comparative Experiments 1 and 2, according to the present invention, it is possible to provide a filter element made of polypropylene applicable to filtration of not only water but also an organic solvent, more inexpensive than filter elements made of an engineering plastic material, and excellent in quality and reproducibility without forming crazing and/or cavities in its sealed portion.

What is claimed is:

1. A filter element comprising a bundle of hollow fibers made of a first polyolefin, which bundle has at least one end with a sealed portion high in sealability and free from crazing and cavities, which is obtained by attaching to said at least one end a second polyolefin in a molten state and having an average molecular weight in the range of 3,000 to 6,000, allowing the molten second polyolefin to set, attaching to the set second polyolefin a molten mixture of the second polyolefin and a third polyolefin having an average molecular weight larger than the average molecular weight of the second polyolefin, and allowing the molten mixture to set.

2. A filter element according to claim 1, wherein said first polyolefin is selected from the group consisting of polypropylene and high-density polyethylene.

3. The filter element according to claim 1, wherein said molten mixture comprises a proportion of the third polyolefin in a range of 10 to 30% by weight.

4. The filter element according to claim 3, wherein said third polyolefin is selected from the group consisting of low-density polyethylene, linear low-density polyethylene, high-density polyethylene and polypropylene.

5. The filter element according to claim 1, wherein said third polyolefin is selected from the group consisting of low-density polyethylene, linear low-density polyethylene, high-density polyethylene and polypropylene.

6. The filter element according to claim 1, wherein said first polyolefin has a melting point higher by up to 30° C. than the second polyolefin.

* * * * *